United States Patent [19]
Miyagawa et al.

[11] Patent Number: 4,677,682
[45] Date of Patent: Jun. 30, 1987

[54] BILL COUNTING MACHINE

[75] Inventors: Tuyoshi Miyagawa, Chigasaki; Eiko Hibari, Tokorozawa; Mitsuharu Kagami, Kawaguchi, all of Japan

[73] Assignee: Laurel Bank Machine Co., Ltd., Tokyo, Japan

[21] Appl. No.: 685,032

[22] Filed: Dec. 21, 1984

[30] Foreign Application Priority Data

Dec. 22, 1983 [JP] Japan .......................... 58-197906[U]

[51] Int. Cl.[4] ............................................ G06K 9/00

[52] U.S. Cl. ...................................... 382/7; 194/207; 209/534; 271/112; 235/475; 356/71; 377/8

[58] Field of Search ................ 209/534; 194/206, 207; 356/71; 271/112, 113, 95, 161; 377/8; 382/7; 235/475, 483, 485

[56] References Cited

U.S. PATENT DOCUMENTS

| | | | |
|---|---|---|---|
| 3,687,448 | 8/1972 | Vora | 271/161 |
| 3,800,155 | 3/1974 | Potenza | 209/534 |
| 4,114,804 | 9/1978 | Jones et al. | 194/207 |
| 4,272,067 | 6/1981 | Yoshida et al. | 271/95 |
| 4,323,768 | 4/1982 | Uchida | 377/8 |
| 4,539,702 | 9/1985 | Oka | 209/534 |
| 4,557,597 | 12/1985 | Iwama | 209/534 |

FOREIGN PATENT DOCUMENTS

| | | | |
|---|---|---|---|
| 0079567 | 6/1980 | Japan | 358/163 |
| 57-16718 | 4/1984 | Japan . | |

*Primary Examiner*—Leo H. Boudreau
*Assistant Examiner*—Jose L. Couso
*Attorney, Agent, or Firm*—Fleit, Jacobson, Cohn & Price

[57] ABSTRACT

A bill counting machine includes a holder for supporting bills thereon and suction heads for turning over the bills, one at a time, to count them. A projector is provided for emitting a ray of light onto the surface of each bill. A receptor is provided for detecting a ray of light reflected from the surface of the bill and for rectilinearly reading the surface pattern of the bill. The rectilinear reading allow judgments as to the denomination and obverse/reverse side of the bills.

4 Claims, 9 Drawing Figures

BILL COUNTING MACHINE

BACKGROUND OF THE INVENTION

The present invention relates to a bill counting machine, and more particularly to a bill counting machine in which bills are counted while detecting the presence of bills of different kinds or denominations mixed in by reading out the optical pattern of the bill surfaces.

The general functions of a bill counting machine are that of counting the number of bills by absorbing and turning over bills one by one by means of the negative pressure of suction heads that rotate while revolving and that of checking for the presence of bills whose denominations are different from that of the bills being counted.

In a conventional bill counting machine, the bills of different denominations are discriminated mainly by differences in their external dimensions. According to this method, however, it is impossible to discriminate between the obverse and reverse sides of bills. Therefore, it is not possible to meet the need to properly arrange the obverse or reverse sides of bills contained in a bundle of bills. At the same time, this method has another disadvantage in that, in the case of various denominations of bills whose dimensions are identical as in the case of U.S. bills, it is impossible to discriminate the presence of bills of different denominations.

Another conventional method of discrimination is that used in the "bill counting machine" disclosed in Japanese Pat. No. 1167062. According to this "bill counting machine," the pattern of a specific spot on a bill is optically read out so as to discriminate between the obverse and reverse sides.

In this method of discrimination, however, measurement errors are liable to occur due to the stains on and creases in the bills. Furthermore, such a method has a drawback in that in cases where the designs of various denominations of bills are similar as in the case of U.S. bills, it is difficult to discriminate between various types of bills.

SUMMARY OF THE INVENTION

It is, therefore, an object of the present invention to provide a bill counting machine which is capable of discriminating between denominations of bills having identical external dimensions or a similar designs and also between the obverse and reverse sides thereof.

According to the invention, there is provided a bill counting machines wherein bills are loaded on a holder and counted by turning over the bills, one at a time, by suction heads, which comprises: a projector for emitting a ray of light on the surface of each bill, and a receptor for detecting a ray of light reflected from on the surface of the bill while the bill is turned over by the suction head and for rectilinearly reading the surface pattern of the bill.

DESCRIPTION OF THE DRAWINGS

Other objects and advantages of the present invention will become apparent from the following description made with reference to the accompanying drawings in which.

DESCRIPTION OF THE PREFERRED EMBODIMENT

One embodiment of the present invention will be now described in detail with reference to the accompanying drawings.

Figure 1:
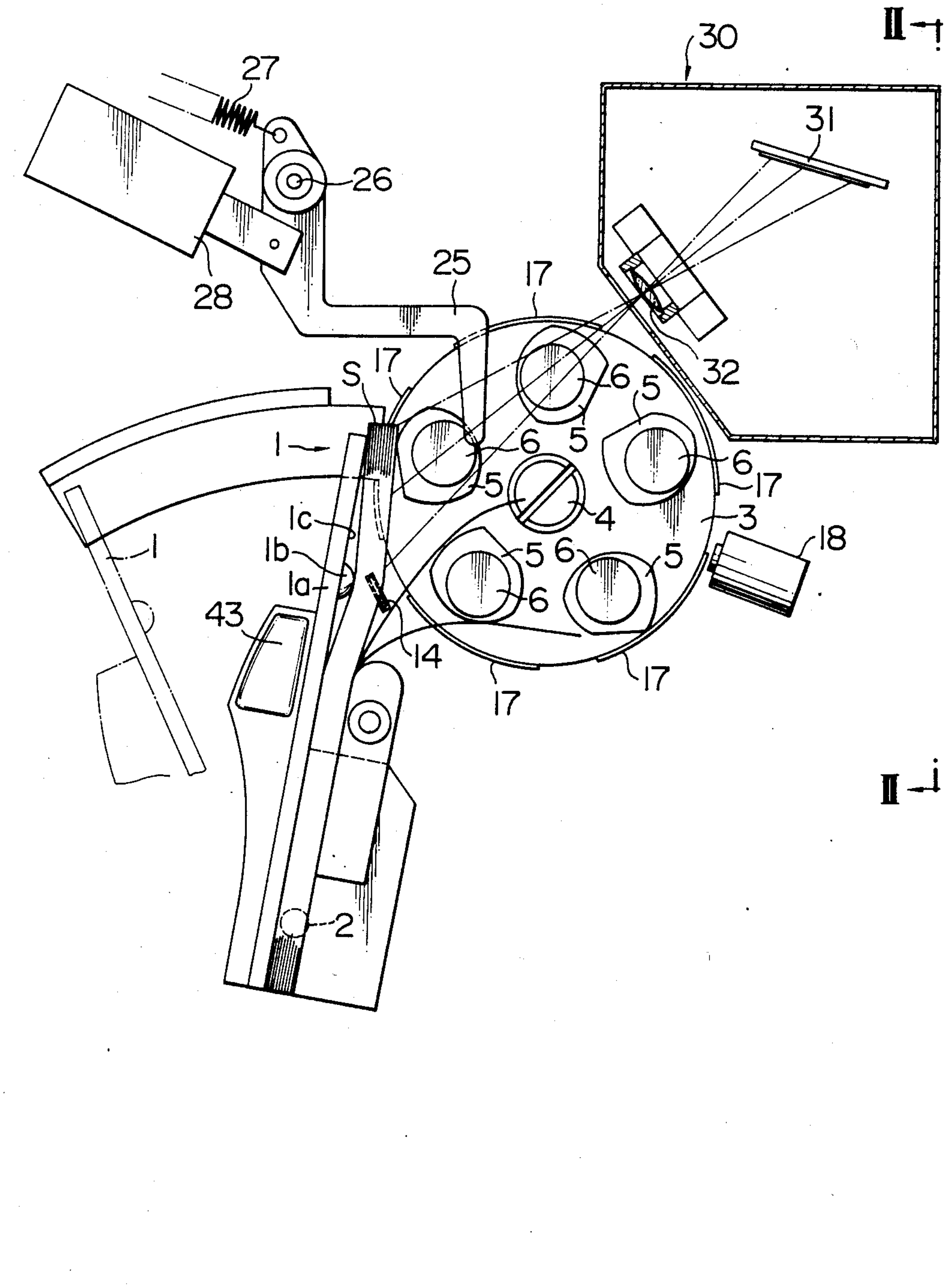
FIG. 1 is a top plan view.
Figure 2:
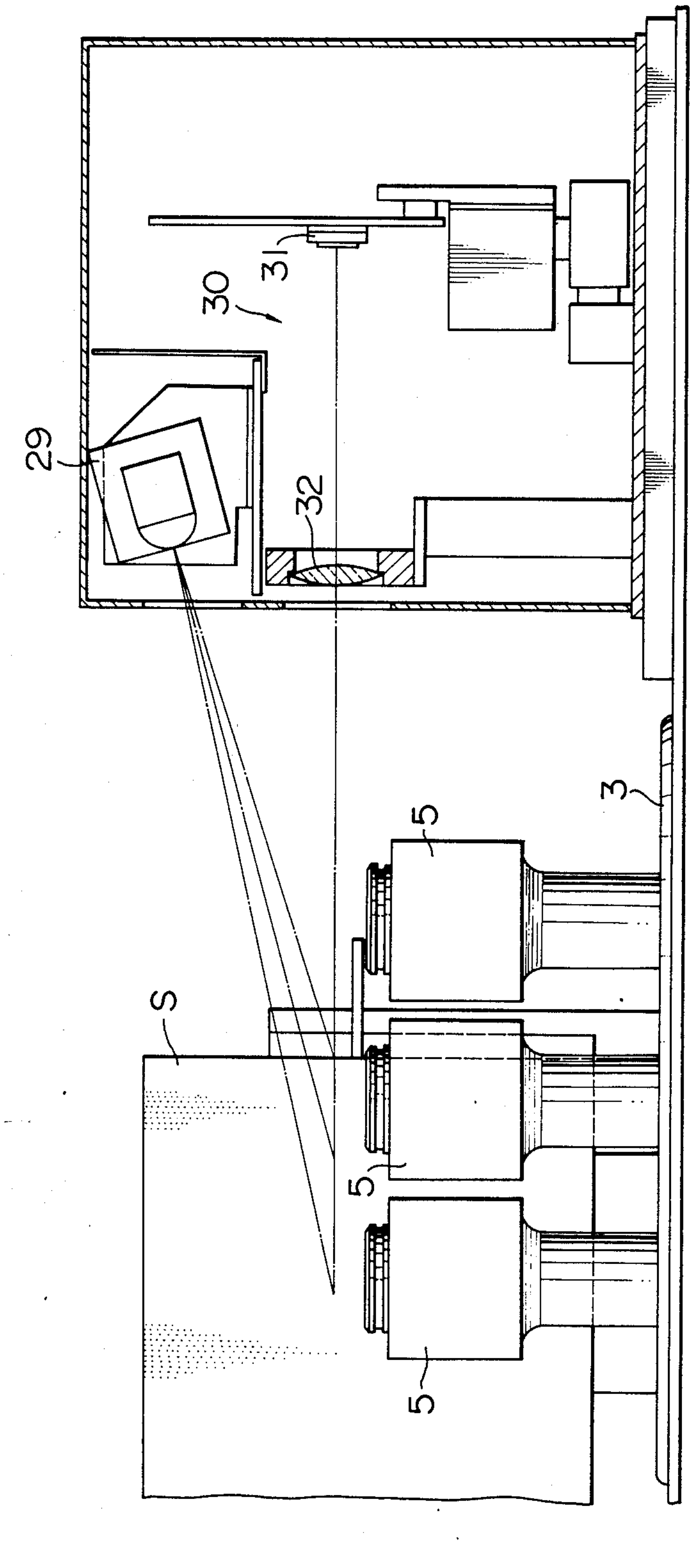
FIG. 2 is a view taken in the direction of the arrows substantially along the line II—II of FIG. 1.
Figure 3:
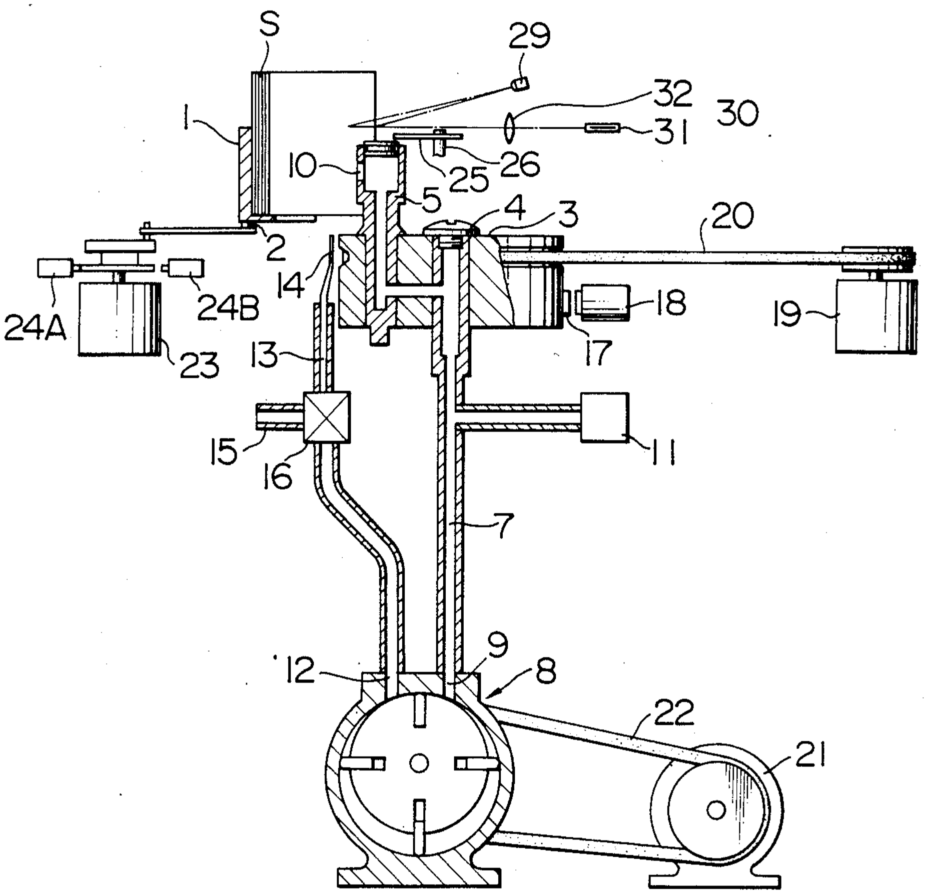
FIG. 3 is a cross-sectional view showing a suction head and a suction pipeline.

Referring now to FIGS. 1 to 3, the arrangement of the mechanism of a bill counting machine will be described. Bills S are loaded in a holder 1 and moved to the counting position indicated by solid lines in FIG. 1 or to a standby position indicated by dotted lines in FIG. 1 as the holder 1 is horizontally rotated about a shaft 2. When the holder 1 is in the counting position, the suction heads 5 on a rotary cylinder 3 are rotated clockwise about shafts 6 while the rotary cylinder 3 is rotated counterclockwise about a shaft 4 as viewed in FIG. 1. Counting is effected by causing negative pressure to act on the inside of the suction heads so as to turn over the bills S on the holder 1 one by one.

As the same time, discrimination of bills is effected as light is projected onto the surface of the bills S from a projector or light emitting device and the light reflected by the bills is read out by means of a receptor or light receiving device, which will be described later.

The holder 1 is provided with a base plate 1*a* for supporting the bills S from the rear side (the opposite side from the suction haed 5). A projection 1*b* for bending the bills S by pushing the end portions thereof from their rear side is provided on the base plate 1*a*. Furthermore, this projection 1*b* has the function of preventing pattern-reading errors resulting from differences in the number of the bills S (the thickness of the pile). This is based on the following reasons: In the bill counting machine, a stack of bills are to be counted and the holder 1 is rotated about the shaft 2. Therefore, as the counting of bills proceeds, the loaded position or angle of the bills which are loaded on the holder gradually varies. Particularly, the difference in angle between the first bill and the last bill becomes great. Consequently, in counting machines having no projection provided, the detected pattern area of the last bill is greater in approximately 10 to 15% than that of the first bill. In other words, the detected pattern of the last bill thus obtained is a compressed one and the accurate judgment cannot be expected. However, it is found out that the provision of the projection on the holder compensates for inclined angle of the bills, that is, keeps the inclined angle of the bills constant. Consequently, the detected pattern area of bill is constant irrespective of the number of bills, and therefore accurate judgment is obtained. In addition, a reflective surface 1*c* is formed on the surface of the base plate 1*a*. This reflective surface 1*c* has the function of compensating for deviations in the reflectance of the stack of bills resulting from differences in the number of bills S.

The reflectance of the reflective surface 1C is determined as in view of the following considerations.

When there are a large number of bills S, it is possible to obtain a fixed level of reflected light from the surface of the bills S, irrespective of the reflectance of the reflective surface of the base plate 1. As the number of bills S decreases, however, the quantity of light transmitted through bills S increases, with the result that the light reflected from bills S is more affected by the reflectance of the reflective surface 1*c*. Accordingly, it is necessary for the reflective surface 1*c* to have a reflectance similar to that in the case where a large number of bills are accumulated. Furthermore, in order to give a desired reflectance to the reflective surface 1*c*, it is ideal to attach a plurality of sheets of paper (paper with reflectance is similar to that of the bills) on the surface of the base plate 1. For instance, the required light reflectance can be obtained by coloring the surface of the base plate 1 or by attaching a rubber, plastic, or other plate onto the surface of the base plate 1.

As shown in FIG. 3, the respective shafts 4 and 6 of the rotary cylinder 3 and the suction heads 5 are formed in a hollow shape and are connected to the suction port 9 of a vacuum pump 8 via a suction pipeline 7. The bills S are absorbed by the suction heads 5, as the vacuum pressure of the vacuum pump 8 acts on the bills S via an opening 10 provided at a portion of the periphery of the suction heads 5. In addition, a vacuum switch 11 is provided midway of the suction pipeline 7. The vacuum switch 11 indicates that the negative pressure inside the suction pipeline 7 has risen to an extent that the bills are absorbed sufficiently.

Meanwhile, an exhaust pipeline 13 is connected to the exhaust port 12 of the vacuum pump 8. An exhaust nozzle 14 for facilitating the separating of bills S by blowing exhaust air onto one side of bills S is provided at the end of this exhaust pipeline 13. On the other hand, midway of the exhaust pipeline is provided a solenoid valve 16 for preventing the occurrence of noise from the exhaust nozzle 14 by changing over the exhaust air to a discharge port 15 when bills are not being counted.

Furthermore, a plurality of actuating pieces 17 each constituted by a magnetic body are attached to the periphery of the rotary cylinder 3. A magnetic sensor 18 is or is not actuated by the respective actuating pieces 17 according to whether a suction head 5 is in its standby position (the position in which the opening 10 faces the bills and the bore of the suction head 5 communicates with the vacuum pump 8) or in the starting position (the position in which the opening 10 is about to face the bills and in which the bore of the suction head 5 is shut off from the vacuum pump 8).

In FIG. 3, the reference numeral 19 denotes a count motor for driving the rotary cylinder 3 via a belt 20; the reference numeral 21, a pump motor for driving the vacuum pump 8 via a belt 22; the reference numeral 23, a holder motor for rotating the holder 1; and the reference numerals 24A and 24B, holder position detecting switches for detecting whether the holder 1 is in its closed position (where the holder is near the suction head 5) or in its opened position (where the holder is away from the suction head 5).

Furthermore, a separator 25 is provided in the vicinity of the rotary cylinder 3. The separator 25 is supported horizontally rotatably by a shaft 26 and is urged counterclockwise as viewed in FIG. 1 by means of a spring 27. Furthermore, the separator 25 is adapted to rotate clockwise as viewed in FIG. 1 by the operation of a batch solenoid 28. This separator 25 has the function of separating a bill which has been turned over and a bill which has not yet been turned over as it is inserted between said bills, when a bill of a different type is detected, as will be mentioned later. Next, a mechanism for discriminating between different types of bills and the obverse and reverse sides of bills will be described. The arrangement of this discriminating mechanism is such that the surface pattern of a bill S is read out rectilinearly by projecting light onto the bills S from projector 29 and directing the light reflected by the bill S onto a receptor 30. The receptor 30 is constituted by a linear image sensor 31 for producing electric signals in response to the surface pattern of the bill S, and a condenser lens 32 for causing the reflected light to converge onto the linear image sensor 31. The linear image sensor 31 is operated by a trigger signal issued from a discrimination controlling circuit, which will be described later. Then, the linear image sensor 31 carries out a rectilinear scanning and converts the quantity of light reflected from a specific line of the bill surface into an electric signal so as to output a signal of the waveform corresponding to the surface pattern of the bill.

In addition, in this embodiment, the occurrence of measurement errors due to creases, folds, vibration, etc. of the bill is prevented by reading out a pattern in the vicinity of the portion absorbed by the suction head 5.

Figure 4:
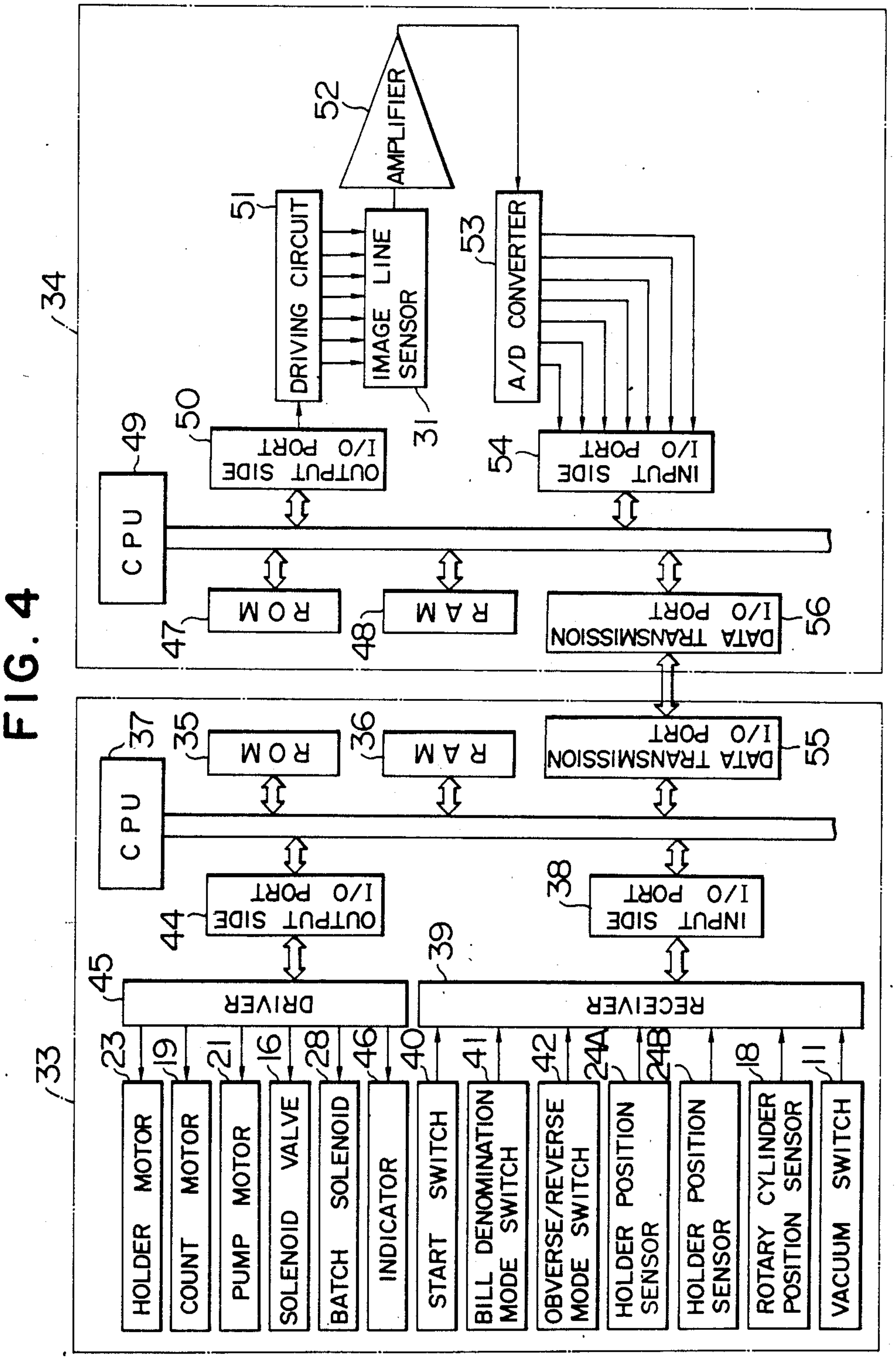
FIG. 4 is a block diagram illustrating a count controlling circuit and a discrimination controlling circuit.

Next, description will be made with reference to FIG. 4 of a count controlling circuit 33 for operating the counting mechanism and a discrimination controlling circuit 34 for operating the discriminating mechanism, respectively.

Briefly, the count controlling circuit 33 comprises: a ROM 35 for storing a count controlling program (refer to FIG. 5), which will be described later; a RAM 36 for temporarily storing various data to be written and read according to the program stored in the ROM 35; and a CPU 37 for controlling them. Further, the following are connected to the CPU 37 via an input side I/O port 38 and a receiver 39: a start switch 40 for issuing a command to start the counting operation; a bill denomination mode switch 41 for selecting a bill denomination mode in which only discrimination of the denomination of the bills is to be carried out at the time of counting; an obverse/reverse made switch 42 for selecting an obverse/reverse in which discrimination of both the denomination of the bills and the obverse or reverse side is to be carried out; holder position detecting sensors 24A and 24B for detecting whether the holder 1 is in its closed or open position; a rotary cylinder position sensor 18; and a vacuum switch 11. In this embodiment, although the start switch 40 is constituted by a pushbutton 43 (refer to FIG. 1) provided on the holder 1, it is also possible to use as the start switch 40, for instance, a sensor (not shown) for detecting that bills S have been loaded on the holder 1.

Additionally, to the CPU 37 are respectively connected via an O/P port 44 and a driver 45 the holder motor 23, counting motor 19, pump motor 21, solenoid valve 16, batch solenoid 28, and an indicator unit 46 provided on an operating panel (not shown) of a bill counting machine or the like to display the number of bills, the presence of abnormalities, etc.

Meanwhile, the discrimination controlling circuit 34 comprises: a ROM 47 for storing the discrimination controlling program (refer to FIG. 6), which will be described later, and the like; a RAM 48 for temporarily storing various data to be written and read according to the program stored in the ROM 47; and a CPU 49 for controlling them. Additionally, the image line sensor 31 is connected to the CPU 49 via an output side I/O port 50 and a driving circuit 51. The ouptut of the image line sensor 31 is input to the CPU 49 via an amplifier 52, a A/D converter 53, and an input side I/O port 54.

Furthermore, the CPU 37 of the count controlling circuit 33 and the CPU 49 of the discrimination controlling circuit 34 are connected to each other via I/O ports 55, 56 for data transmission so as to be capable of exchanging data, thereby effecting an interlinked operation.

Figure 5:
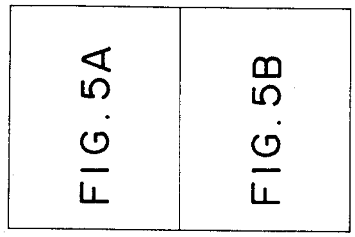
FIGS. 5A–B is a flow chart for a count controlling operation.
Figure 5A:
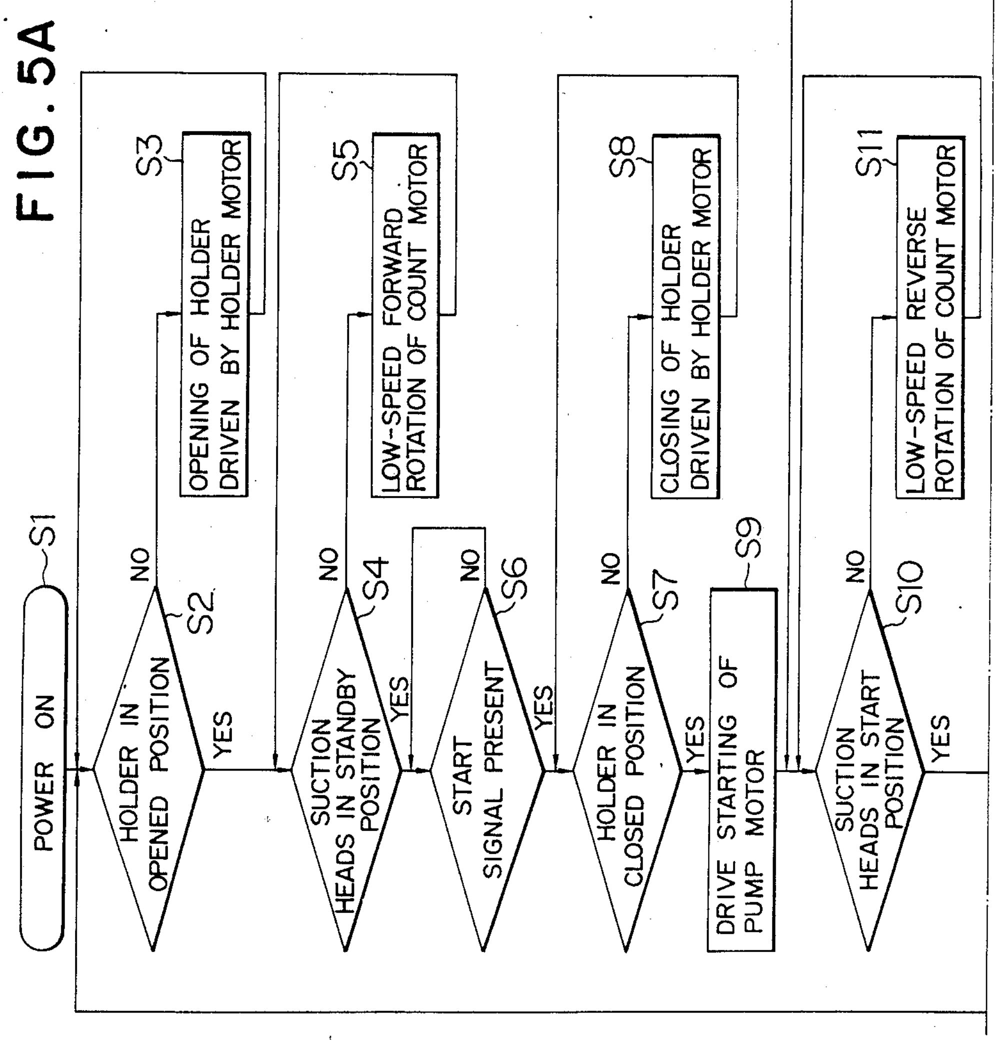
Figure 5B:
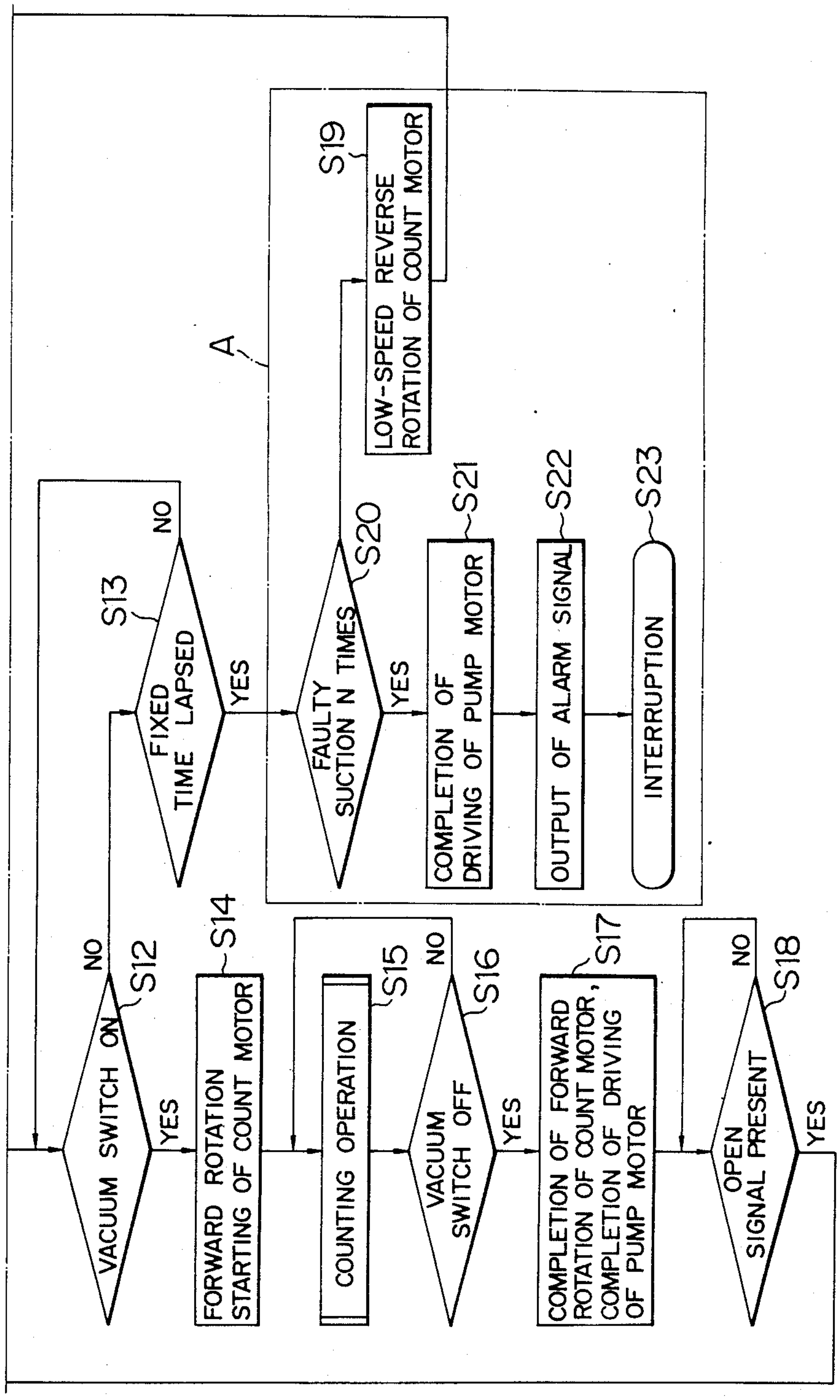
Figures 6, 6B:
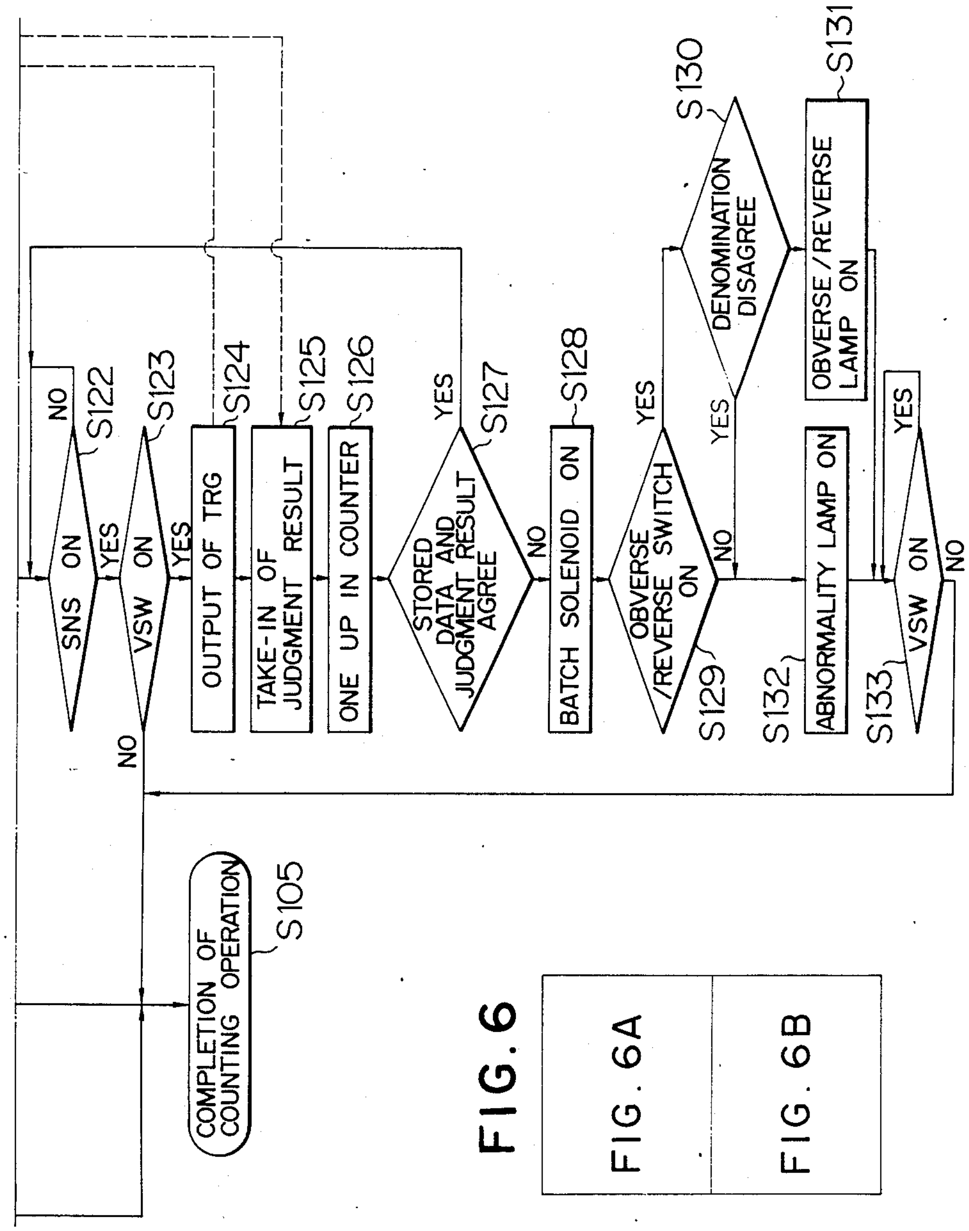
FIGS. 6A–B is a flow chart for a discrimination controlling operation.
Figure 6A:
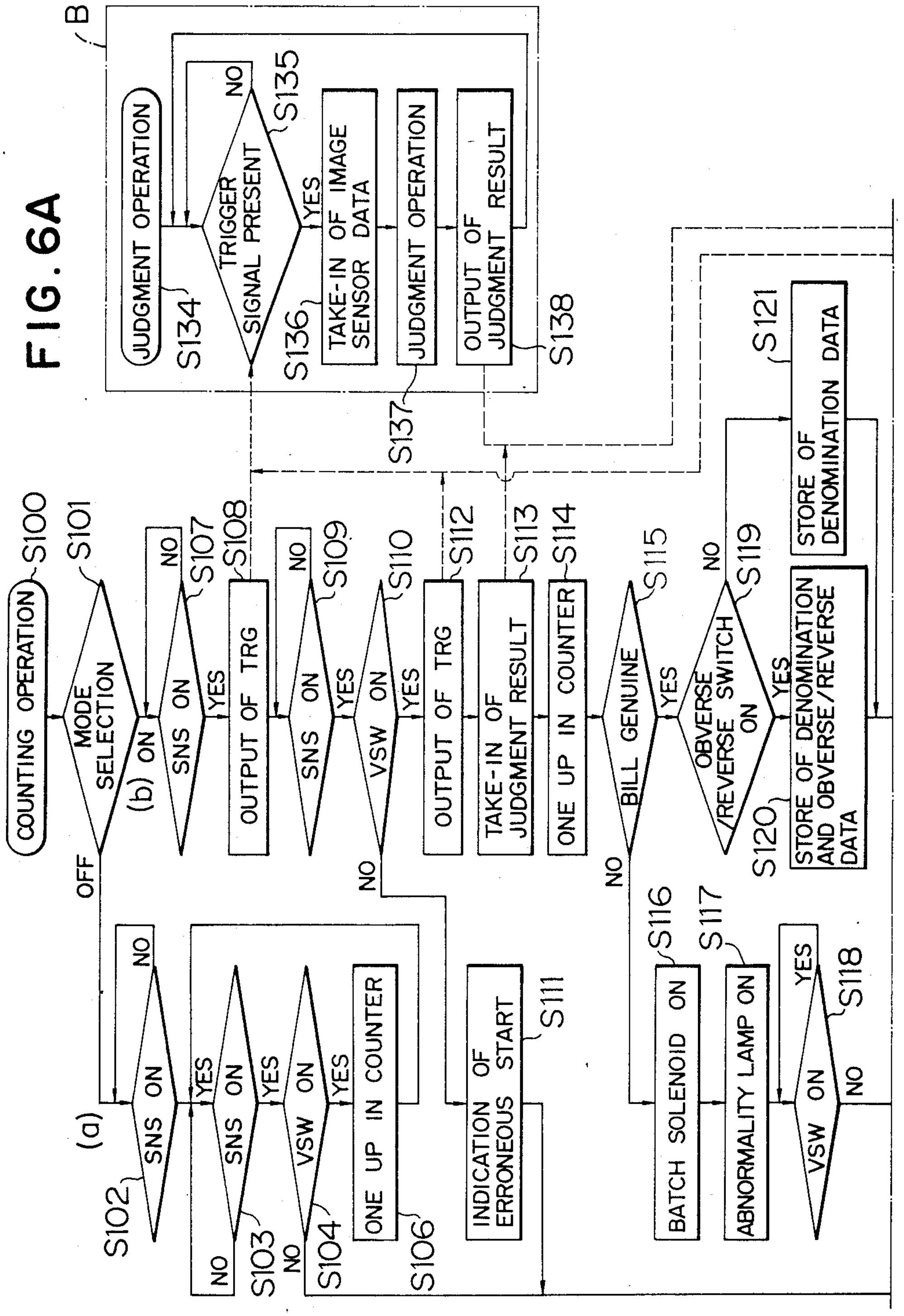
Figure 7:
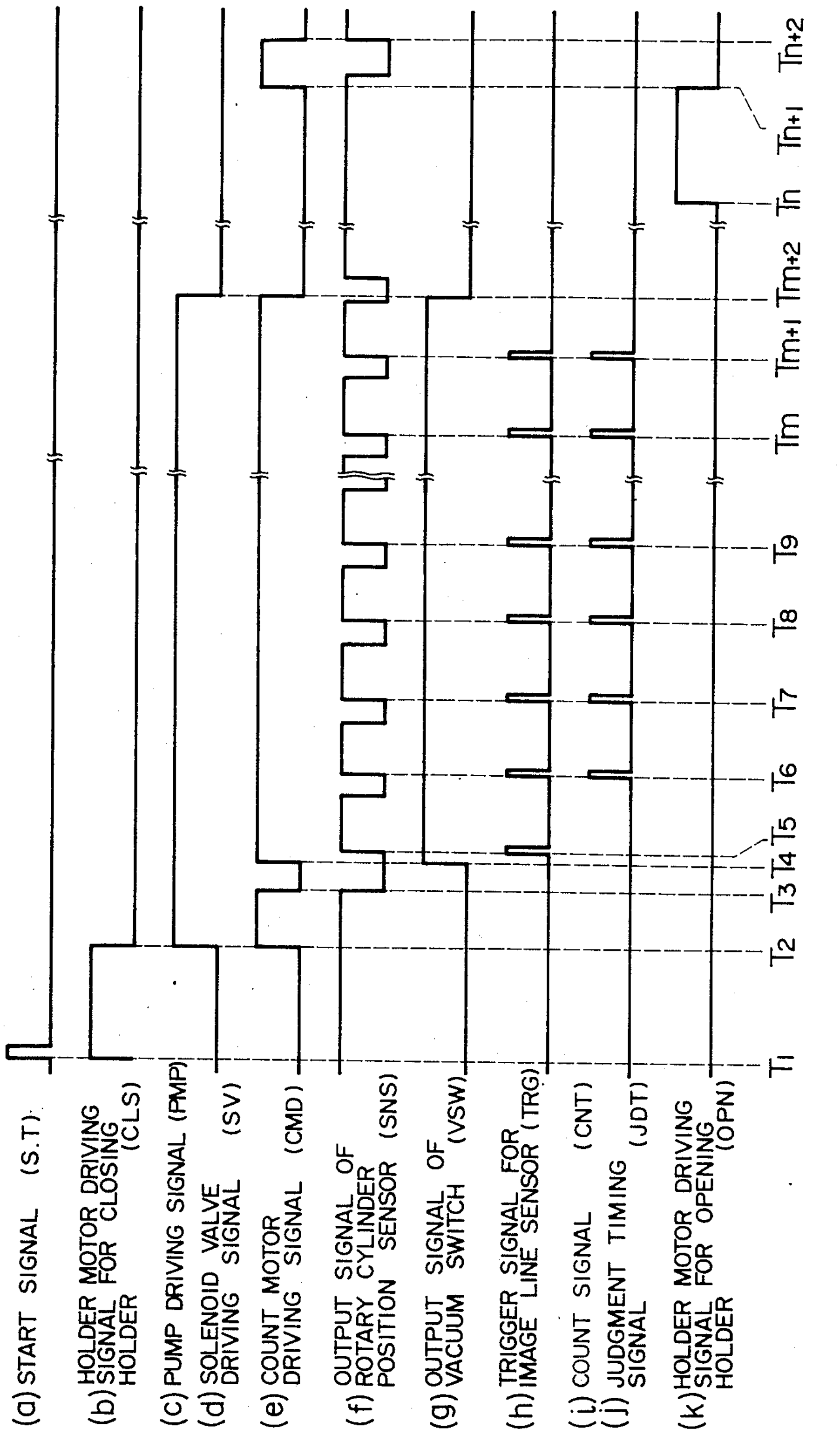
FIG. 7 is a timing chart for the count controlling operation and discrimination controlling operation.

With reference to FIGS. 5 to 7, description will now be made of the contents of the program stored in the ROM 35 of the count controlling circuit 33 and the ROM 47 of the discrimination controlling circuit 34, in conjunction with the operation of the bill counting machine. It should be noted that SN in FIGS. 5 and 6 denotes the step N and $T_n$ in FIG. 7 denotes the timing $T_n$.

(A) Count controlling operation (refer to FIGS. 5 and 7)

(Step 1)

Power is turned ON.

(Step 2)

Judgment is made by means of output signals from the holder position detecting sensors 24A, 24B as to whether or not the holder 1 is in its open position. In the case of NO, the holder motor 23 is driven to set the holder 1 in its open position (Step 3), and, in the case of YES, the operation proceeds to the next step.

(Step 4)

Judgment is made from the output of the rotary cylinder position sensor 18 as to whether or not each suction head 5 is in its standby position. In the case of NO, the counting motor 19 is driven to slowly move so as to set the suction head 5 in its standby position (Step 5). In the case of YES, the operation proceeds to the next step.

(Step 6)

Judgment is made as to whether or not a start signal has been issued from the starting switch 40. On condition that a start signal has been issued, the operation proceeds to the next step. (Timing $T_1$)

(Step 7)

Judgment is made on the basis of the output of the holder position sensors 24A, 24B as to whether or not the holder 1 is in its closed position. In the case of NO, the holder motor 23 is driven to set the holder 1 in its closed position (Step 8), and, in the case of YES, the operation proceeds to the next step.

(Step 9)

The pump motor 21 is operated, and the solenoid valve 16 is changed over to the exhaust nozzle 14. Further, a start signal for the count motor 19 is issued. (Timing $T_2$)

(Step 10)

Judgment is made as to whether or not the suction heads 5 are in their start position. In the case of NO, the count motor 19 is driven in the reverse direction at a low speed to set the suction heads 5 in their start position (Step 11), and, in the case of YES, the operation proceeds to the next step. (Timing $T_3$)

(Step 12)

Judgment is made as to whether or not the vacuum switch is turned ON, namely, whether or not the negative pressure inside the suction pipeline 7 has risen to a predetermined level. In the case of NO, judgment is made as to whether or not a predetermined time (the time required for a rise in negative pressure) has lapsed from the timing $T_3$ (Step 13). In the case of NO in this Step 13, the operation returns to Step 12, and, in the case of YES in Step 13, the operation proceeds to a faulty suction processing route (shown by a dotted line A in FIG. 5). Meanwhile, in the case of YES in this Step 12, the operation proceeds to the next step. (Timing $T_4$)

(Step 14)

The count motor 19 is driven, and the rotary cylinder 3 and the suction heads 5 rotate.

(Step 15)

Counting is effected as the suction heads 5 turn over bills one by one. Each time the rotary cylinder position sensor 18 issues a signal, a trigger signal for taking out the output of the image line sensor 31 is output, and the bill discriminating and counting operations are repeated. (Timing $T_5-T_{m+1}$)

(Step 16)

Judgment is made as to whether or not the vacuum switch 11 is turned OFF, namely, whether or not there is no bill to be turned over and negative pressure inside the suction pipeline 7 cannot rise. On condition that the vacuum switch 11 is turned OFF, the operation proceeds to the next step.

(Step 17)

The count motor 19 and the pump motor 21 are stopped. (Timing $T_{m+2}$)

(Step 18)

When the rotation of the rotary cylinder 3 is stopped in the preceding Step 18, judgment is made as to whether or not a driving signal (OPN) for opening the holder motor has been output (Timing $T_n$). On condition that OPN has been output, the operation proceeds to Step 2.

Furthermore, simultaneouly as OPN is turned OFF, a count motor driving signal is output (Timing $T_{n+1}$) to drive the count motor 19, and the rotary cylinder 3 rotates. When the suction heads 5 move to their standy position by this rotation, the ON output of the rotary cylinder position sensor 18 is issued, and, at the same time, the count motor 19 is stopped (Timing $T_{n+2}$). When the suction heads 5 are thus stopped in their standby position, the condition for immediately starting count is set by the next start signal (Step 6), thereby completing the preparation.

Next, description will be made of the faulty suction processing route A.

In cases where it is impossible for the rotary cylinder 3 to stop at its predetermined position due to such causes as malfunctioning of the braking operation of the count motor 19, the inside of the suction pipeline 7 is not sealed from the outisde, so that the negative pressure fails to rise even after more than a fixed time has elapsed. Therefore, it is impossible for the vacuum switch 11 to assume the ON condition (Step 13).

In such a case, the count motor 19 is rotated reversely at a low speed, the position of the rotary cylinder 3 is adjusted (Step 19), and Step 10 or 12 is repeated. Furthermore, in a case where the vacuum pressure fails to rise ever after repeating this operation N times (Step 20), the pump motor 21 is stopped (Step 21), an alarm signal is output (Step 22), and then the machine is stopped (Step 23).

(B) Discrimination controlling operation (Refer to FIGS. 6 and 7)

(Step 100)

The machine is started.

(Step 101)

Judgment is made as to whether or not the bill denomination mode switch 41 or the obverse/reverse mode switch 42 is ON, namely, whether or not it is necesary to read the pattern of the bill surface. If both said switches are OFF, the operation proceeds in the direction of (a) indicated by an arrow in FIG. 6 and performs counting only. If either of the switch 41 or 42 is ON, the operation proceeds in the direction of (b) indicated by an arrow in FIG. 6, and both discrimination and counting are performed.

(a) In case of only the counting operation (counting mode)

(Step 102)

The presence of the rise of an output signal (SNS) of the rotary-cylinder position sensor 18 is detected (Timing $T_5$).

(Step 103)

On condition that the output of SNS has risen, the next rise of SNS is detected (Timing $T_6$).

(Step 104)

Judgment is made as to whether or not an output signal (VSW) of the vacuum switch 11 has been output at the same timing as that described in the preceding Step 103. In the case of NO (Timing $T_{m+2}$), since bills to be counted are not present, VSW is turned OFF, and the operation proceeds to the completion of the counting process (Step 105), while, in the case of YES, the operation proceeds to the next step.

(Step 106)

According to the preceding Step 104, it follows that one bill has been turned over, and the counter counts up one. Then, the operation returns to Step 103 and repeats counting (Timing $T_7-T_{m+1}$).

(b) When the denomination of the bill is judged (denomination bill mode), or when both the denomination of bill and the obverse or reverse side are judged (obverse/reverse mode)

(Step 107)

On condition that the rise of SNS has been detected and YES has been given, the operation proceeds to the next step (Timing $T_5$).

(Step 108)

A trigger signal (TRG) is caused to rise at the same timing as that of the preceding Step 107. With this rise of TRG as a condition of starting, the dicrimination handling route (indicated by the chain line B), which will be described later, starts the discrimination of bills.

(Step 109)

The rise of SNS is detected, and on condition that YES has been given, the operation proceed to the next step (Timing $T_6$).

(Step 110)

Judgment is made as to whether or not VSW is ON at the same timing as that described in the preceding Step 109. In the case of NO, an indication is given that it is an erroneous start (Step 111), and then the machine is stopped (Step 105). In the case of YES, it follows that a bill has been turned over, and the operation proceeds to the next step.

(Step 112)

In the timing of Step 109, the operation is in the state of starting the discrimination of the next bill, so that TRG is output to cause the discrimination handling route B to discriminate the next bill.

(Step 113)

The result of discrimination of the first bill in the discrimination handling route B is written in the memory of the RAM 36 for storing the result of discrimination.

(Step 114)

Counter counts up one for one bill.

(Step 115)

On the basis of the result of discrimination written in RAM 36 in Step 113, judgment is made as to whether or not the bill which was counted in the preceding Step 114 is genuine. In the case of NO, the batch solenoid 28 is operated, and the separator 26 is inserted between the bill which has been turned over and the bill which has not been turned over (Step 116). Then, the abnormality-indicating lamp of the indicator 46 is lit (Step 117), and judgment is made as to whether or not VSW has been output (Step 118). on condition that VSW has not been output, the machine is stopped (Step 105). On the other hand, in the case of YES (i.e., the bill which has been counted is judged to be genuine), the operation proceeds to the next step.

(Step 119)

Judgment is made as to whether or not the obverse/-reverse mode switch 42 is ON. In the case of YES, the results of the discrimination of both the denomination of the bill and the obverse or reverse side are written in another memory area of RAM 36, for instance, a memory area for standard bill data (Step 120). In the case of NO, the data on denomination of the bill is written in said memory area of RAM 36 (Step 121).

(Step 122)

On condition that SNS has risen (Timing $T_7$), the operation proceeds to the next step.

(Step 123)

Judgment is made as to whether or not VSW has been output, namely, whether or not a bill has been turned over. In the case of NO (when there is no bill to be turned over), the operation proceeds to the aforementioned Step 105, and the counting operation is completed. In the case of YES, the operation proceeds to the next step.

(Step 124)

TRG is output to the discrimination handling route B.

(Step 125)

The result of discrimination is written in the memory area of RAM 36 for the result of discrimination.

(Step 126)

Counter counts up one.

(Step 127)

Judgment is made as to whether or not the reference data stored in the memory area of the RAM 36 for storing the result of discrimination, and the result of discrimination, agree. In the case of YES, the operation proceeds to Step 122 and repeats Step 122 through Step 127 (Timing $T_8-T_{m+1}$). In the case of NO, the operation proceeds to the next step.

(Step 128)

The 'batch' solenoid 28 is actuated, and the separator 25 is inserted between bills.

(Step 129)

Judgment is made as to whether or not the obverse/-reverse mode switch 42 has been depressed or not. In the case of YES, judgment is made as to whether the denomination of the bill is wrong (Step 130), while, in the case of NO (i.e, when the denomination of the bill is right), the obverse/reverse lamp of the indicator 46 is lit (Step 131), and the operation proceeds to the next step. On the other hand, in the case of YES in Step 130 (i.e., when the denomination of the bill is wrong) and in the case of NO in Step 129 (i.e., when the obverse/reverse mode has not been selected), the different bill denomination lamp of the indicator 46 is lit (Step 132), and the operation proceeds to the next step.

(Step 133)

Judgment is made as to whether or not VSW has been output, and on condition that VSW is OFF, the operation proceeds to Step 105, and then the machine stops.

Next, description will be made of the aforementioned discrimination handling route B.

(Step 134)

The machine is started.

(Step 135)

Judgment is made as to whether or not TRG has been output, and on condition that TRG has been output, the operation proceeds to the next step.

(Step 136)

The data of the linear image sensor 31 is input. In other words, the data is written in the detected data area of the RAM 48.

(Step 137)

Judgment is made as to what pattern of bill denomination the aformentioned data shows and as to whether the pattern of bill denomination in question shows the obverse or reverse side. The bill pattern data serving as reference has been stored in the reference-data area of the ROM 47.

(Step 138)

The results of judgment are output to (written in) the port memory of the data transmission I/O port 56, so that the results of judgment can be read in Step 113 or 125.

In the discrimination process based on the reference data and the detected data in the preceding Step 137, it is not necessary for both data to completely agree with each other. It is desirable that judgment be made by establishing an appropriate degree of agreement between both data and on the basis of whether this degree of agreement is met or not. Also, it is possible to effect an efficient handling of the count discriminating process by setting this degree of agreement to a high or low level, as required.

As is apparent from the aforementioned explanation, the present invention has the following effects:

(a) Since the accuracy of discrimination is enhanced as the obverse or reverse pattern of a bill is read rectilinearly, it is possible to positively detect bills whose denomination or obverse or reverse side is not arranged properly, even if the external dimensions, surface patterns, etc. of bills are similar.

(b) Since patterns are read with bills being absorbed by suction heads, errors due to the vibration of bills or the like are unlikely to occur.

What is claimed is:

1. A bill counting machine comprising:

a holder for holding a stack of bills, suction means for picking up the bills from said holder and turning over the bills, one at a time, a projector for emitting a ray of light onto the surface of each bill, a receptor for detecting a ray of light reflected from a surface of the bill while the bill is turned over by said suction means and for rectilinearly reading a surface pattern of the bill, and a projection provided on the holder at a side of said holder facing a rear surface of the bills for deflecting the bills outwardly away from said holder, said projection being located on the holder so that the stack of bills are held at a uniform distance and angle relative to the receptor, thereby compensating for rectilinear reading of the surface pattern of the bills to thereby prevent pattern reading errors resulting from a difference in the number of bills on said holder by maintaining constant a detected pattern area of the bills.

2. A machine according to claim 1, wherein a reflective material is provided on the holder at said side facing said rear surface of the bills, said reflective material having substantially the same reflectance as that of the bill for compensating for a deviation in the reflectance in the stack of bills.

3. A machine according to claim 1, wherein a denomination of the bill is judged by the rectilinear reading of the surface pattern of the bill.

4. A machine according to claim 1, wherein an obverse/reverse side of the bill is judged by the rectilinear reading of the surface pattern of the bill.

* * * * *